United States Patent [19]

Ottesen

[11] 4,005,477
[45] Jan. 25, 1977

[54] PHASE EQUALIZED READBACK APPARATUS AND METHODS

[75] Inventor: Hjalmar Holmboe Ottesen, Oslo, Norway

[73] Assignee: International Business Machines Corporation, Armonk, N.Y.

[22] Filed: Nov. 24, 1975

[21] Appl. No.: 634,800

[52] U.S. Cl. .................................. 360/51; 360/28
[51] Int. Cl.² ...................... G11B 5/02; G11B 5/09
[58] Field of Search ................ 360/26, 22, 28, 39, 360/51

[56] References Cited
UNITED STATES PATENTS

| | | | |
|---|---|---|---|
| 3,181,133 | 4/1965 | Seitner | 360/28 |
| 3,253,237 | 5/1966 | Runyan | 360/28 |
| 3,488,452 | 1/1970 | Gunning et al. | 360/28 |
| 3,938,184 | 2/1976 | Detrancesco et al. | 360/28 |

*Primary Examiner*—Vincent P. Canney
*Attorney, Agent, or Firm*—Herbert F. Somermeyer

[57] ABSTRACT

A magnetic recorder employs a feedback phase equalizer for adjusting the readback signal to enhance detection capability. Phase errors are measured and used as criteria for dynamically and adaptively adjusting phase compensation of the read-back signal. In a preferred form, averaging phase errors over a predetermined signal characteristic of the readback signal controls adjustment of phase equalization.

14 Claims, 5 Drawing Figures

PHASE EQUALIZED READBACK APPARATUS AND METHODS

BACKGROUND OF THE INVENTION

The present invention relates to digital signal magnetic recorders and more particularly to enhanced readback apparatus and methods employable with such recorders.

In digital signal recording, the point of main interest in many cases is the zero crossing of the readback signal. All information is determined based upon such zero signal crossing. Techniques have been used to adjust the zero crossing to convert it to peaks, peak detection, and other forms of signal processing; however, all of these processes have one thing in common—they extract the digital data based upon a predetermined relationship to zero signal crossings.

Digital signal recorders have employed automatic gain control, AGC, in an attempt to enhance detection of the data contained in the readback signal. Further, equalizing and compensation techniques have been used during the recording of such signals, such as the phase compensation taught by Ambrico in U.S. Pat. No. 3,503,059. Also, during readback of such recorded signals, phase adjustments have been made based upon feed forward control, upon wavelength analyses, signal format violations, and most popularly by adjusting the phase of the readback clock using phase lock loop techniques.

All of the above techniques have had varying degrees of success for controlling the detectability of the readback signal. Various techniques are more applicable to one recording density than another recording density. It has been common in the recent past to rapidly increase the recording density of signals on flexible magnetic media. Each time there is a quantum increase in density, there is a corresponding quantum increase in problems associated with detecting the information represented by the readback signal. Accordingly, enhanced signal processing techniques are needed for enhancing the detectability of data contained in high density signals derived from a magnetic recording medium.

A further problem is that a single magnetic medium can be used by a plurality of signal recorders having diverse readback and recording characteristics. Even if the nominal design of a plurality of recorders is the same, variations in manufacturing, head-to-medium spacing, and aging of the various component parts results in a diversity of characteristics among the recorders. This diversity tends to induce errors and limits the capability of recorders to interchange magnetic media while achieving faithful reproduction of recorded information. A second goal is to enhance the interchangeability of the record medium by applying error control techniques to the various signal recorders for enhancing their capability to accommodate permutations induced in the readback signal from any component part changed in any recorder, such changes being unknown or unpredictable.

SUMMARY OF THE INVENTION

It is an object of this invention to provide an automatic phase control (APC) for enhancing readback of signals from a recorded magnetic medium while simultaneously enhancing interchangeability of such medium among a plurality of digital signal recorders. A feature is continuous minimization of an average phase error between readback signal and a locally generated clock or timing signal.

In accordance with the invention, a method of enhancing magnetic media interchange between a plurality of magnetic recorders includes adaptively equalizing the phase of the readback signals from the magnetic media in any one of said recorders in accordance with the predetermined relationship of the readback signal with predetermined characteristics of the one recorder. In a preferred form, the predetermined relationship is between a set of phase errors measured between a signal provided by the recorder indicating desired signal properties and the phase of the readback signal as measured against that reference signal.

The invention also contemplates the method of operating a signal recorder which supplies a digital readback signal having predetermined phase and properties. The method includes the steps of establishing a reference signal in the recorder indicative of predetermined signal phase properties. The readback signal is compared with the reference signals with any phase deviations being indicated. The readback signal is then phase adjusted on a dynamic basis based upon the predetermined cycle of the readback signal for phase errors. In a preferred form, the measurement cycle is determined by a successive number of phase errors which also includes an indication of the quantity of the phase errors for any number of cycles.

The invention also provides enhanced readback circuitry for a digital signal recorder employing a signal peak shifting circuit. A phase lock loop receives the peak adjustment signal from the peak shifting circuit and generates a phase error signal. The phase error signal is digitized in accordance with its duration, i.e., indication of phase error quantity. The indications are integrated for a predetermined number of phase error indications resulting in an averaged quantum of phase error. That phase error is then compared with a stored, previously measured, phase error for indicating the trend of the readback signal to create additional phase errors or more closely follow a reference signal. As a result of such comparison, an adjustment signal is generated and supplied to the peak shifter for adjusting the phase of the incoming readback signal in accordance with the last-mentioned indication.

The foregoing and other objects, features, and advantages of the invention will be shown and described with reference to a preferred embodiment thereof, as illustrated in the accompanying drawing.

THE DRAWING

DETAILED DESCRIPTION

Figure 3:
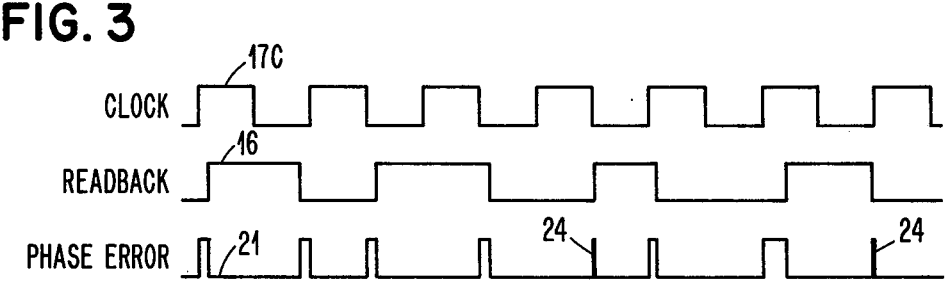
FIG. 3 shows a simplified set of signal waveforms used to illustrate the operation of a portion of the FIG. 1 illustrated apparatus.

Referring now more particularly to the drawing, like numerals indicate like parts and structural features in the various diagrams. A recorded magnetic medium 10 has a set of digital signals sensed by a scanning transducer 11 supplying readback signals through amplifier 12 and amplitude equalizer 13 to a phase adjustable equalizer 14. Equalizer 14 responds to signals supplied by apparatus of the present invention to adjust the phase of the readback signal in a predetermined manner. Such phase adjusted signals are supplied to a clock and detector 15 which may include, and preferably does include, a hard limiter for squaring the signals, such as signal 16 of FIG. 3. The clock and detector includes a phase lock loop for detection of the signal 16. A double-frequency clock 17C is generated by a phase lock loop (not shown) of clock and detector 15 for synchronous detection to supply a set of detected data signals over line 17 to a utilization apparatus (not shown). Additionally, the clock signal 17C is supplied over line 20 to a plurality of apparatus of the present invention timing same to be synchronous with the readback signal 16. The phase lock loop phase adjusts the phase of the clock to the readback signal for maintaining phase precision between the signals.

Readback signal 16 ideally should be in zero-crossing phase synchronism with clock 17. However, this is not always the case because of various perturbations in signal 16 induced by various parameters of a magnetic digital signal recorder, including media parameters. As a result, even with a phase lock loop clock, there are slight perturbations in such precise phase synchronism resulting in phase errors such as indicated by signal 21. It is to be understood that the phase lock loop of clock and detector 15 attempts to follow the frequency and phase of readback signals 16. Hence, it has its own phase compensation circuit for adjusting the clock in frequency in-phase, as is well known in the art. Phase error signals 21 leave clock and detector 15 over line 22 to phase error counter 23. Phase error counter 23 can be constructed in one of two ways. The first way is that the phase error signals 21 open a gate (not shown) within counter 23 for passing high-frequency signals to a counter. In the preferred mode, error counter 23 merely counts the phase error signals 21. It should be noted that narrow signals 24 have insignificant phase errors and may not be counted because of low energy content. In this regard, a threshold can be established for defining the type of phase error to be compensated for or to be used in calculating the phase adjustment for equalizer 14. In any event, error counter 23 sums the phase errors represented by signal 21. At this point, it should be noticed that the phase error can be positive or negative in a stream of readback signals. Hence, the sign of the phase error may be used in generating the error indicator in counter 23. That is, the phase errors may cancel out, requiring no adjustment of equalizer 14. Such plus and minus phase errors can be caused by the data modulation of the readback signal, among other things.

The summed error count from counter 23 is supplied over cable 30 to threshold decoder 31. Whenever a predetermined error count-in is reached, decoder 31 supplies an activating signal over line 32 actuating sequencer 33 to change modes, as later described, and to initiate an adjustment of equalizer 14 by adjusting the count of the equalizer control counter 34 in accordance with a predetermined delta amount indicated by the signal on line 35 and in accordance with the signal indicated on line 36.

Sequencer 33 actuates signal property measurement circuit 40 to make successive phase error measurements in accordance with phase error signals 21 received through sequencer 33, as later described, from line 22. In a first cycle, a first integrator 41 sums the phase errors and supplies same to compare circuit 42C. During this particular time period, integrator 42 stores the previously measured summation of phase errors and supplies same to compare 42C. When decode 31 supplies the K=N signal over line 32, sequencer 33 in turn supplies an identical signal over line 43 actuating the adjustment controls 44. Controls 44 respond synchronously to the clock 17C signal on line 20, to the actuating signal on line 43, and to the compare signal received over line 45 to initiate adjustment of counter 34 in accordance with the signal content of memory 46 and the signal received on line 45. Additionally, the K=N signal resets counter 23.

For each counter or integrator apparatus, an analog integrator circuit followed by a threshold detector may be employed. The error counts in counter 23 may be still stored digitally as described. The outputs of any analog circuit can be digitized for storage.

Figure 1:
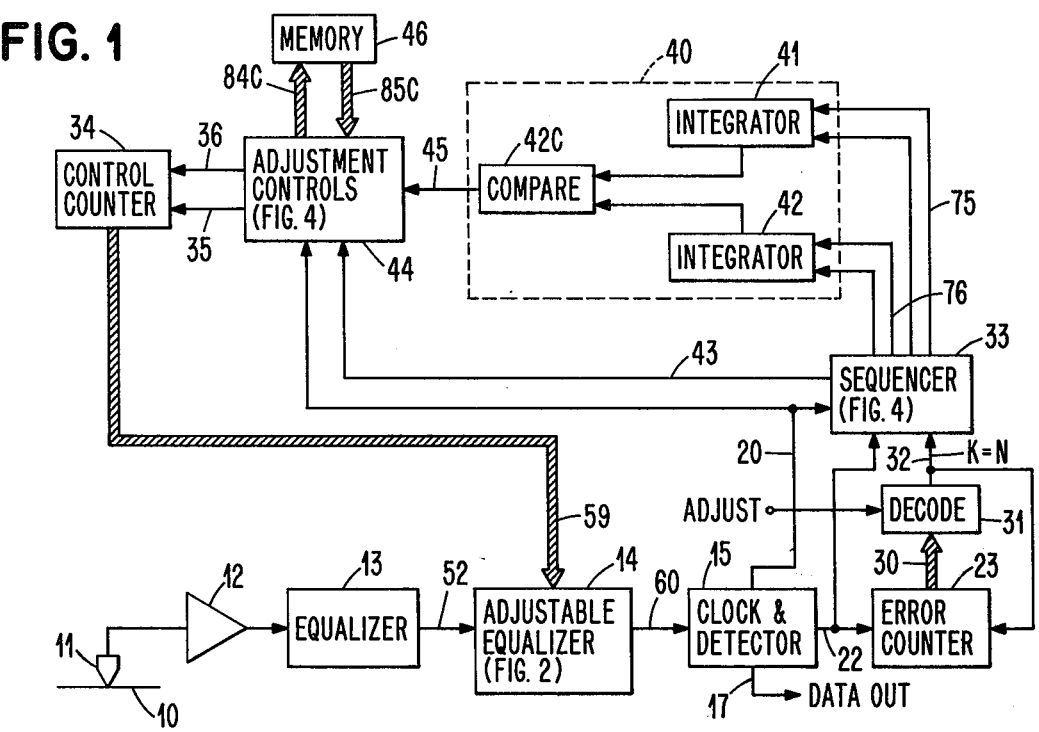
FIG. 1 is a block diagram of apparatus employing the present invention.
Figure 1A:
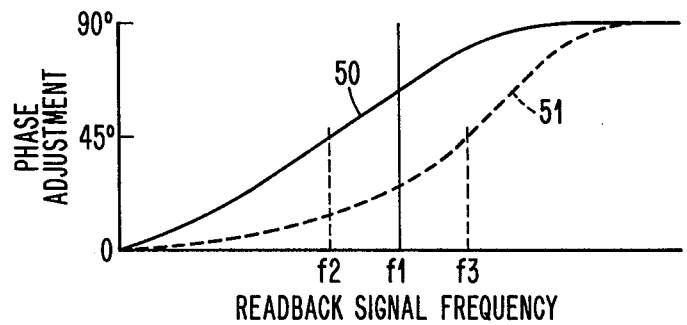
FIG. 1A is a phase-frequency plot of one phase adjustment characteristic of the present invention.
Figure 2:
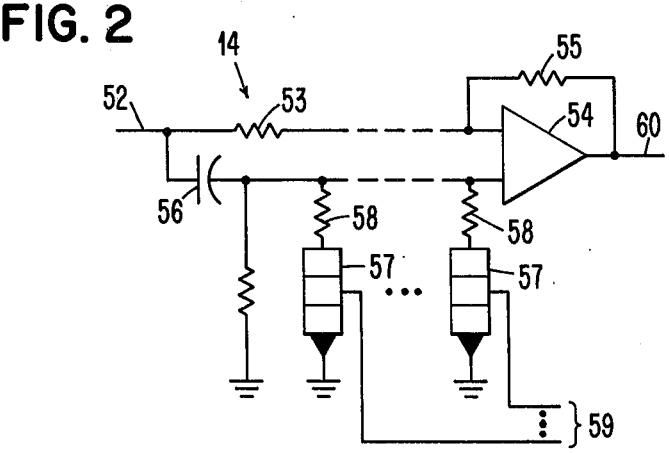
FIG. 2 is a schematic diagram of an adjustable phase equalizer usable with the FIG. 1 illustrated apparatus.

All of the above circuitry, as later described in more detail with respect to FIG. 4, results in a phase adjustment to frequency characteristic shown in FIG. 1A. That is, the illustrated embodiment provides a variable phase filter according to the term "$\tan^{-1}\omega R_3C$", wherein $\omega$ is the signal frequency, $R_3$ is a calibrating resistor in the later-described FIG. 2 illustrated equalizer, and C is the capacitor in the phase adjusting equalizer 14, as later described with respect to FIG. 2. The $f1$ frequency is the so-called "all-1's" data frequency. Frequencies $f2$ and $f3$ are frequencies related to one inverse of the time constant $R_3C$. The solid curve 50 represents a first value of $R_3$, while the dotted line curve 51 represents a second value. Accordingly, by adjusting the time constant of the phase equalizer, various phase responses can be achieved yielding wide recorder design possibilities by implementing the present invention.

Referring to FIG. 2, phase adjustable equalizer 14 is shown in its preferred form. The input signal received on line 52 from a fixed equalizer 13 flows through a resistor 53 to a first input of operational amplifier 54. Amplifier 54 has the usual feedback resistor 55. The phase adjustment portion includes a capacitor 56 having value C and a series of switchable resistances, the sum total of which is represented by the value $R_3$. The controlling transistor switches 57 selectively switch resistors 58 in and out of the phase adjusting portion of circuit 14. Actuating these switches in accordance with the content of control counter 34 signals supplied over cable 59 adjusts the phase adjustment readback signal frequency characteristics between lines 50 and 51, as shown in FIG. 1A. Hence, it is seen that the phase adjustment provided is quite substantial, particularly at the important frequency $f1$. The phase adjusted from operational amplifier 54 is supplied over line 60 to clock and detector 15.

Figure 4:
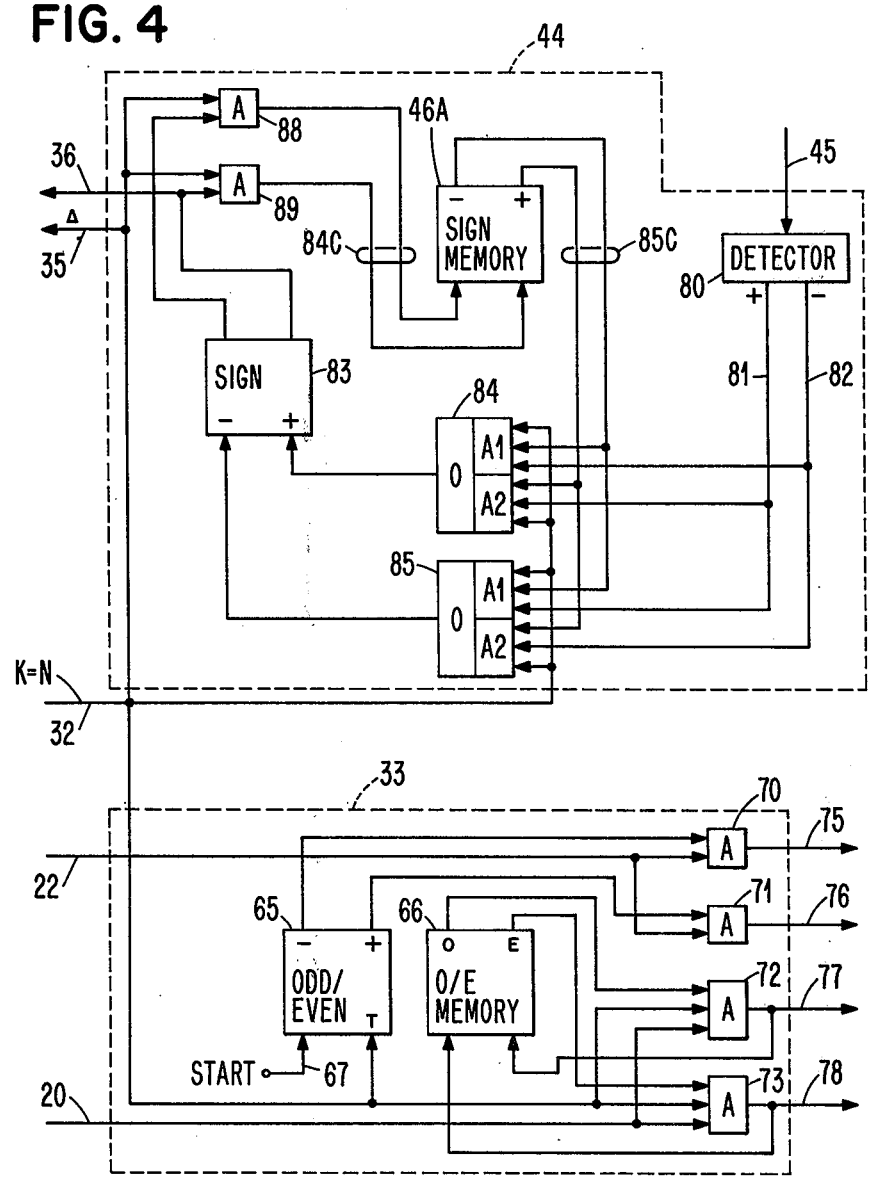
FIG. 4 is a logic diagram of certain portions of the FIG. 1 illustrated apparatus.

Referring next to FIG. 4, the details of sequencer 33, adjustment control 44, and their interaction with the measurement circuit 40, are shown in more detail. In general, integrators 41 and 42 alternately measure the seriousness of the phase error signals 21 and initiate a compare whenever the summation of error counter 23 reaches a predetermined threshold as determined by decode 31. Decode 31 may be made adjustable for accommodating various readback situations such as initializing readback of data, highly error-prone conditions, and the like. Sequencer 33 alternates the integration of the error signal 21 by integrators 41 and 42, as well as alternating the reset under control of the odd-/even latch 65 and odd/even memory 66. Each time decode 31 supplies a K=N signal over line 32, odd/even latch 65 is toggled to its opposite stable indicating state. Latch 65 can be initialized by a start signal on line 67 such that integrator 41 will always integrate the first phase error quantity, although in a practical embodiment which integrator starts the integration is incidental.

Four logic AND circuits 70, 71, 72, and 73 respond to latches 65 and 66 to gate squelch and phase error signals to integrators 41 and 42. Since the phase error signals are amplitude limited, it is the duration of the signals that is integrated, the integration being in the time domain independent of amplitude.

AND circuit 70 responds to odd/even latch 65 being in the odd or negative state to pass the phase error signals 21 received over line 22 to line 75 for integration by integrator 41. Integrator 41 may be either an analog or digital integrator. Similarly, odd/even latch 65 being in the even state (+) activates AND circuit 71 to pass the line 22 phase error signals 21 to line 76 for transmittal to integrator 42. Squelch control is under the memory latch 66 which actuates AND circuit 72 at the end of the memory cycle for integrator 41 to supply a squelching signal over line 77 to squelch the content of integrator 41 to a reference potential (reset a counter, for example) in preparation for the next integration. The AND circuit further responds to the K=N signal on line 32 and to a clock signal 17 received over line 20 to complete the actuation. Similarly, AND circuit 73 supplies an integrator 42 squelching signal over line 78 in response to odd/even memory latch 66 being in the even state to squelch integrator 42 at the end of its memory cycle. Each squelch signal on lines 77 and 78, in turn, sets the memory latch 66 to the next state in preparation for squelching the alternate integrator.

In accordance with the above-described operation, integrator 41 is first squelched, then integrates the phase error signal 21 until K=N, at which time its integrated contents are compared by circuit 42C content of the alternate integrator 42. After the comparison, integrator 42 is squelched and integrator 41 is in its memory cycle. Integrator 42 then integrates the phase error signal 21 until K=N again. Then, the cycle is repeated, all under control of odd/even latch 65.

Compare 42C supplies its compare signal of integrators 41 and 42 constantly over line 45 to adjustment control circuit 44. Detector 80 in circuit 44 determines whether the comparison is (+) or (−). That is, if the signal content of integrator 41 has a greater amplitude than the signal content of integrator 42, a (+) signal is supplied over line 81; whereas if the reverse is true, an activating signal is supplied over line 82. The detector 80 signals are combined with the sign memory signals from latch 46A. Each time K=N, the signal on line 32 is active to set the sign signal to the appropriate direction of signal change as indicated by latch 83. As a result of these operations, as determined by a pair of AO circuits 84 and 85, Asignal on line 35 is a unitary incremental signal corresponding to the K=N signal; while the line 36 signal is derived from latch 83, as will become apparent. The arrangement is such that if the phase error measured by the most recent integration is less than the previous phase error, the sign of correction is appropriate and will not be changed. However, if the most recently measured phase error is greater than the previously measured phase error, then the sign must be reversed because integrators 41 and 42 are alternately actuated. The AO circuits 84 and 85 decoding takes into consideration the sign of the previous change as memorized in latch 46A. In an early embodiment of the invention, sign memory latch 46A constituted the entire memory wherein cable 84C consisted of two lines transferring the contents of latch 83 to latch 46A while cable 85C consisted of two lines conveying the signal state of signal memory latch 46A to AO circuits 84 and 85 decoder. The relationship is shown in Table I below.

Table I

| New Sign | Cycle | 81 | 82 | Old Sign |
|---|---|---|---|---|
| − | O | + | − | + |
| + | O | − | + | + |
| + | O | + | − | − |
| − | O | − | + | − |
| + | E | + | − | + |
| − | E | − | + | + |
| − | E | + | − | − |
| + | E | − | + | − |

In the table above, columns 81 and 82 correspond, respectively, to lines 81 and 82. Line 81 being (+) indicates that the signal content of integrator 41 is greater than integrator 42. A (−) sign in that column indicates the reverse. In column 82, a (−) sign indicates that integrator 41 has a greater signal value than integrator 42; and a (+) sign indicates the reverse. Odd and even cycles are indicated by O and E, respectively, corresponding to the (−) and (+) states, respectively, of latch 65. Inspection of Table I shows the operation will tend to zero in on zero phase error. This action in combination with the phase lock loop intending to follow the data signals, provides a greater probability of detecting data in high-frequency recording.

The signal content of the present sign latch 83 is transferred to the memory latch 46A by a pair of AND circuits 88 and 89, respectively, sampled by the line 32 signal.

The AO circuits 84 and 85 decoder is designed to implement the Table I indicated truth functions. Inspection of the drawing will show that the Table I functions are executed each K=N time.

In summary, optimizing the phase of the signal to be detected based on averaging phase errors enhances synchronous signal detection. In low signal-to-noise ratios, the phase lock loop phase synchronism is enhanced by practicing the present invention.

While the invention has been particularly shown and described with reference to a preferred embodiment thereof, it will be understood by those skilled in the art that various changes in form and detail may be made therein without departing from the spirit and scope of the invention.

What is claimed is:

1. The method of operating a magnetic signal recorder supplying a readback signal having predetermined desired phase and frequency properties,
   the steps of:
   establishing a reference signal indicative of said predetermined properties;
   comparing said reference signal and said readback signal and indicating deviations in said readback signal from said desired properties; and
   phase adjusting said readback signal in accordance with said indication.

2. The method set forth in claim 1 further including the steps of:
  summing said deviations between said reference signal and said readback signal for a predetermined characteristic of said readback signal;
  storing said summation;
  repeating said summation; and
  comparing two of said summations for determining the phase adjustment of said readback signal in accordance with said indication.

3. The method set forth in claim 2 further including the steps of:
  comparing said reference signal and said readback signal each transition of said readback signal;
  counting said comparisons which yield a deviation; and
  phase adjusting said readback signal in accordance with said indication after a predetermined number of said comparisons.

4. The method set forth in claim 3 establishing a sign of phase adjustment direction for each said summation;
  for the sign of each phase adjustment, comparing the signs of two successive ones of said summations and, if the signs are equal, reversing the direction of phase adjustment.

5. The method set forth in claim 4 further including the step of generating a phase adjustment size independent of said summation.

6. The method set forth in claim 1 further including the step of counting said comparisons yielding said indicated deviations; and
  phase adjusting after a predetermined number of said deviation-causing comparisions independent of the size of said deviations.

7. The method of enhancing magnetic media interchange between a plurality of magnetic recorders while sensing signals recorded on a medium by a one of said recorders, the steps of comparing said sensed signal with predetermined characteristics of said one recorder, and
  adaptively equalizing the phase of the sensed signals in accordance with a predetermined relationship of said sensed signal with predetermined characteristics of said one recorder.

8. The method set forth in claim 7 wherein the step of adaptively equalizing includes the step of indicating errors in said readback signals;
  counting the number of errors;
  summing the error and its direction;
  memorizing the sum and direction of the error; and
  repeating the above steps and comparing the summations and the sign and adaptively equalizing in accordance with said comparison.

9. For a readback circuit of a magnetic recorder, a readback signal peak shifting circuit comprising:
  a controllable peak shifter circuit for receiving a periodic signal to have peak shift adjustments;
  a phase-locked loop (PLL) circuit receiving the peak adjusted signal from said peak shifting circuit and generating a phase error signal, circuit means digitizing the phase error signal in accordance with its time duration;
  integration circuit means receiving said digitized signals and holding integrating signals generated from same for comparison with other integrated signals generated from later received digitized signals;
  compare circuit means comparing the integrated signals at predetermined times;
  timing circuit means responsive to said PLL to time all said circuits and circuit means;
  timed circuit means responsive to said comparing circuit means to supply an adjustment signal; and
  an up/down counter circuit for adjusting its count in accordance with said adjustment signal for variably controlling said peak shifter in accordance with an accumulation of said adjustment signals.

10. The readback signal peak shifting circuit set forth in claim 9 and further including:
  sign means determining direction of said up/down counter circuit adjustment;
  means; memorizing direction of said adjustment; and
  comparison means responsive to said memorized sign and another of said signs to change direction of said adjustment when the signs are equal.

11. The apparatus set forth in claim 10 wherein said integration circuit means includes first and second integrators;
  sequencing circuit means responsive to said digitized phase error circuit means to alternately actuate said integrators to integrate the digitized phase error signals; and
  threshold means responsive to said digitizing circuit means to actuate said sequencer for alternating said integration and simultaneously actuating said compare circuit means for comparihng the integrator results.

12. The apparatus set forth in claim 10 further including error counter circuit means responsive to said phase-locked loop circuit for indicating the number of successive phase error signals; and
  threshold means responsive to said error counter to actuate said timing circuit means and said timed circuit means for initiating a phase adjustment.

13. The apparatus set forth in claim 10 wherein said timed circuit means actuates said up/down counter means by a unitary adjustment signal each time a phase adjustment is called for.

14. The method of operating a digital signal detector, the steps of:
  generating a local timing signal supposedly in phase synchronism with a signal to be detected;
  measuring and averaging phase differences between said local timing signal and said signal to be detected; and
  phase adjusting the signal to be detected in accordance with the average phase difference.

* * * * *